(12) United States Patent
Sekine

(10) Patent No.: US 12,077,092 B2
(45) Date of Patent: Sep. 3, 2024

(54) SADDLE RIDING VEHICLE CORNERING LIGHT STRUCTURE

(71) Applicant: HONDA MOTOR CO., LTD., Tokyo (JP)

(72) Inventor: Tasuku Sekine, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/127,699

(22) Filed: Mar. 29, 2023

(65) Prior Publication Data

US 2023/0311742 A1 Oct. 5, 2023

(30) Foreign Application Priority Data

Mar. 31, 2022 (JP) ................................. 2022-058797

(51) Int. Cl.
| | |
|---|---|
| *B60Q 1/12* | (2006.01) |
| *B60Q 1/00* | (2006.01) |
| *B62J 6/022* | (2020.01) |
| *B62J 45/415* | (2020.01) |

(52) U.S. Cl.
CPC .............. *B60Q 1/12* (2013.01); *B60Q 1/0023* (2013.01); *B62J 6/022* (2020.02); *B62J 45/4151* (2020.02); *B60Q 2300/134* (2013.01); *B60Q 2300/136* (2013.01)

(58) Field of Classification Search
None
See application file for complete search history.

(56) References Cited

U.S. PATENT DOCUMENTS

| | | | | |
|---|---|---|---|---|
| 4,870,545 | A | * 9/1989 | Hatanaka | B60Q 1/122 362/466 |
| 2017/0101147 | A1 | 4/2017 | Hasegawa | |
| 2019/0366908 | A1 | 12/2019 | Horn | |
| 2019/0366909 | A1 | 12/2019 | Kimura | |
| 2020/0282896 | A1* | 9/2020 | Fujii | B62J 6/24 |
| 2021/0078484 | A1* | 3/2021 | Fujii | B60Q 1/122 |

FOREIGN PATENT DOCUMENTS

| | | |
|---|---|---|
| EP | 2792584 | * 10/2014 |
| JP | 02-182549 | 7/1990 |
| JP | 2017-074820 | 4/2017 |
| JP | 2018-134918 | 8/2018 |
| JP | 2020-006876 | 1/2020 |
| JP | 2021-526104 | 9/2021 |

OTHER PUBLICATIONS

Japanese Office Action for Japanese Patent Application No. 2022-058797 mailed Dec. 5, 2023.

* cited by examiner

*Primary Examiner* — Ashok Patel
(74) *Attorney, Agent, or Firm* — Amin, Turocy & Watson, LLP

(57) ABSTRACT

A saddle riding vehicle cornering light structure is provided on a saddle riding vehicle which banks a vehicle body in a rightward-leftward direction and performs cornering, and enlarges an illumination range in a direction to which the vehicle body is banked at the cornering, the structure including: a banking angle detection device that detects a banking angle of the vehicle body using a distance measurement device which measures a distance to a road surface; and a light main body that illuminates the direction to which the vehicle body is banked in accordance with the banking angle detected by the banking angle detection device.

7 Claims, 4 Drawing Sheets

SADDLE RIDING VEHICLE CORNERING LIGHT STRUCTURE

CROSS-REFERENCE TO RELATED APPLICATION

Priority is claimed on Japanese Patent Application No. 2022-058797, filed on Mar. 31, 2022, the contents of which are incorporated herein by reference.

BACKGROUND

Field of the Invention

The present invention relates to a cornering light structure of a saddle riding vehicle.

Background

In the related art, a cornering light is known which detects a banking angle of a saddle riding vehicle using a gyro sensor such as an IMU (Inertial Measurement Unit) and enlarges an illumination range in a traveling direction (rotation direction) on a bank side (for example, refer to Japanese Unexamined Patent Application, First Publication No. 2020-006876).

SUMMARY

However, in the cornering light of the related art, a light main body is incorporated into a vehicle body, and it is necessary to form an opening for the light main body on a vehicle body exterior or provide a structure for attaching a light. In such a configuration, when the cornering light is used in other models, a dedicated component and a dedicated design are required, which is a factor of increasing costs.

However, due to the increase in costs of the IMU and an L/O limitation, it is difficult to use the cornering light on many models.

An object of an aspect of the present invention is to provide a saddle riding vehicle cornering light structure which prevents costs from increasing and enhances layout flexibility.

A first aspect of the present invention is a saddle riding vehicle cornering light structure that is provided on a saddle riding vehicle which banks a vehicle body in a rightward-leftward direction and performs cornering and that enlarges an illumination range in a direction to which the vehicle body is banked at the cornering, the structure including: a banking angle detection device that detects a banking angle of the vehicle body using a distance measurement device which measures a distance to a road surface; and a light main body that illuminates the direction to which the vehicle body is banked in accordance with the banking angle detected by the banking angle detection device.

According to this configuration, the cornering light can be constituted by using an existing clearance sensor or the like, and the cornering light can be realized by reducing costs compared with the case where the IMU (Inertial Measurement Unit) or the like is used.

In a second aspect, the light main body and the banking angle detection device may constitute an integral light unit, and the light unit may be attached in a separate manner to a vehicle body component.

According to this configuration, the light main body and the banking angle detection device constitute an integral light unit, and thereby, it is possible to facilitate optional setting of the cornering light and facilitate attachment to the vehicle body.

In a third aspect, a plurality of light units may be provided and distributed to right and left sides of the vehicle body and may be symmetrically arranged in a rightward-leftward direction with respect to a vehicle body rightward-leftward middle.

According to this configuration, by arranging the light unit that includes the banking angle detection device to be distributed to both right and left sides of the vehicle body, each of the distances between each road surface on both right and left sides of the vehicle body and each banking angle detection device (distance measurement device) is measured, the banking angle and the banking direction of the vehicle body can be easily detected, and the banking direction of the vehicle body can be easily illuminated.

In a fourth aspect, the distance measurement device may have a detection portion on a lower surface of the light unit, a detection region of the detection portion may be directed to a vehicle lower side, and a component of the saddle riding vehicle may be set so as not to interfere with the detection region at least in a vehicle body upright state.

According to this configuration, the detection region of the distance measurement device is directed to the vehicle lower side and is set to avoid the vehicle component, and thereby, it is possible to reliably measure the distance between the distance measurement device and the road surface.

In a fifth aspect, a rearview mirror that enables viewing of a vehicle rearward direction may be attached to a steering handle that is gripped by an occupant, and the light unit may be attached to the rearview mirror.

According to this configuration, by ensuring the ground height of the light unit (distance measurement device), the variation in the distance between the road surface and the distance measurement device at the time of vehicle body banking is increased, and it is possible to facilitate the measurement of the distance between the road surface and the distance measurement device.

In a sixth aspect, a lever guard that protects an operation lever which is provided on the steering handle may be attached to a steering handle that is gripped by an occupant, and the light unit may be attached to the lever guard.

According to this configuration, by ensuring the ground height of the light unit (distance measurement device), the variation in the distance between the road surface and the distance measurement device at the time of vehicle body banking is increased, and it is possible to facilitate the measurement of the distance between the road surface and the distance measurement device. The lever guard is located in the vicinity of the outermost side of the saddle riding vehicle together with a grip portion of the steering handle and is arranged to be offset to a forward direction of the steering handle. Since the light unit (distance measurement device) is attached to the lever guard, the steering handle, the hand of an occupant, and the like do not easily interfere with the detection region of the distance measurement device, and it is possible to facilitate the measurement of the distance between the road surface and the distance measurement device.

In a seventh aspect, the distance measurement device may have a detection portion on each of both right and left sides of the vehicle body, and the banking angle detection device may compare values detected by the detection portions on both right and left sides of the vehicle body with each other and estimate the banking angle.

According to this configuration, by comparing the distances between the detection portions on both right and left sides of the vehicle body and road surfaces on both right and left sides of the vehicle body and detecting the banking angle of the vehicle body, the cornering light can be further reliably operated.

In an eighth aspect, the banking angle detection device may perform a cornering determination and turn on the light main body when the banking angle becomes equal to or more than a reference value.

According to this configuration, in a cornering light using an existing clearance sensor or the like, by turning on or off the cornering light at the boundary of the reference value (threshold value) of the banking angle, it is possible to realize the cornering light by a simple control.

In a ninth aspect, the banking angle detection device may not perform a cornering determination when a distance measured by the distance measurement device is shorter than a predetermined lower limit value.

According to this configuration, when the distance measured by the distance measurement device is significantly short, since it is conceivable that the body such as the occupant's hand, clothing, baggage, or the like enters the measurement region, by stopping the cornering determination when the measurement distance is significantly short, it is possible to prevent erroneous detection of the vehicle body banking angle.

In a tenth aspect, the banking angle detection device may perform a cornering determination and turn on the light main body when a vehicle speed of the saddle riding vehicle becomes equal to or more than a predetermined reference value.

According to this configuration, even if the distance measurement device measures an erroneous distance due to a step on the road surface, an object, or the like at the time of extremely low-speed traveling of the saddle riding vehicle, at the time of stopping, and the like, it is possible to prevent the cornering light from turning on and off unnecessarily.

According to the aspect of the present invention, it is possible to provide a saddle riding vehicle cornering light structure which prevents costs from increasing and enhances layout flexibility.

DESCRIPTION OF EMBODIMENTS

Figure 1:
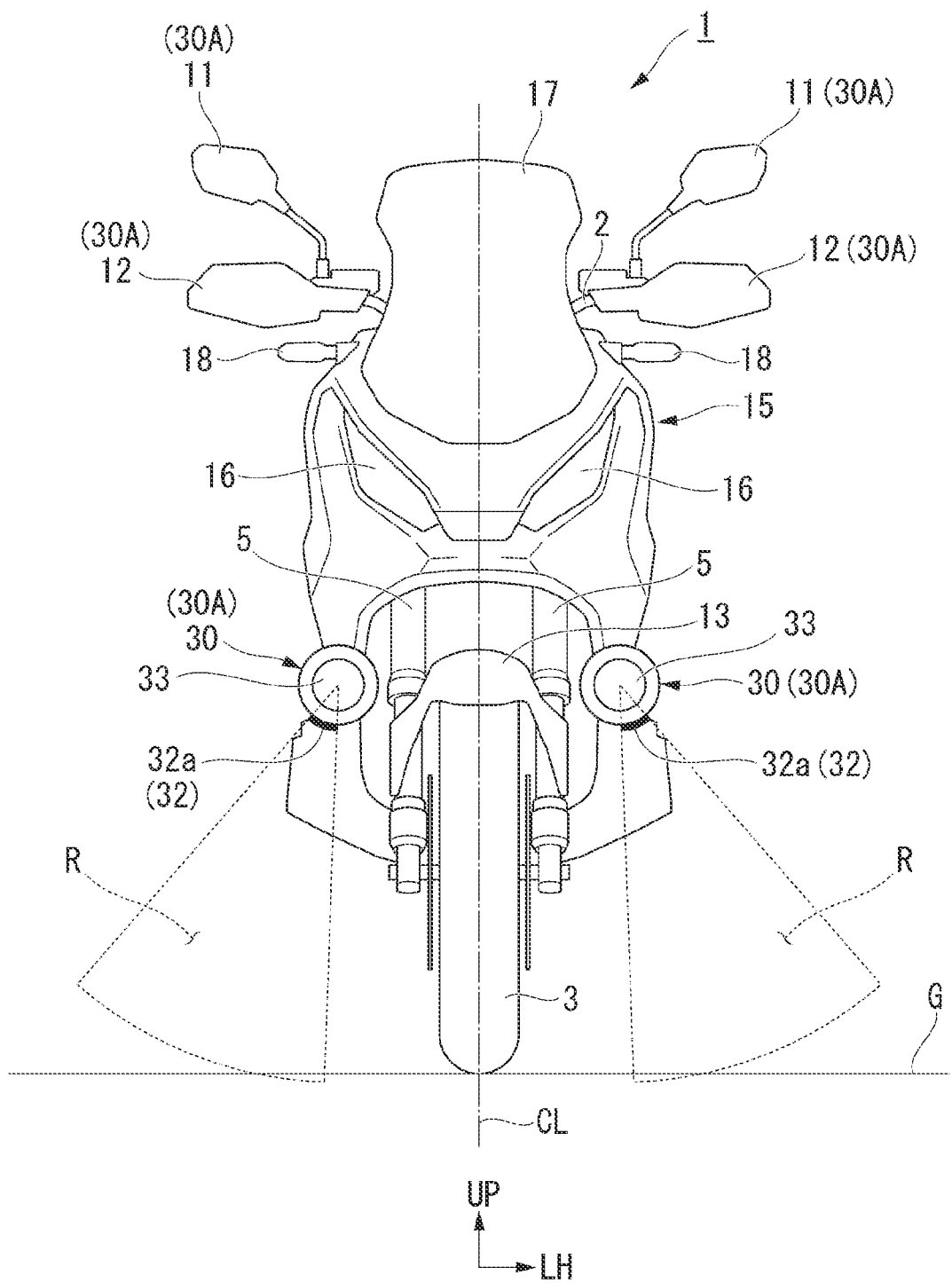
FIG. 1 is a front view of a motorcycle in an embodiment of the present invention.

Hereinafter, an embodiment of the present invention will be described with reference to the drawings. Directions such as forward, rearward, rightward, and leftward directions in the following description are the same as directions in a vehicle described below unless otherwise specified. Further, in appropriate positions in the drawings used in the following description, an arrow FR that indicates a vehicle forward direction, an arrow LH that indicates a vehicle leftward direction, an arrow UP that indicates a vehicle upward direction, and a line CL that indicates a vehicle body rightward-leftward middle are shown.

FIG. 1 is a front view of a motorcycle 1 that employs a cornering light 30 in an embodiment of the present invention. The motorcycle 1 shown in FIG. 1 is a so-called adventure-type saddle riding vehicle in consideration of traveling not only on a surfaced road but also on an unsurfaced road.

The motorcycle 1 includes: a front wheel 3 capable of being steered by a bar-type steering handle 2; a power unit (not shown) that includes an internal combustion engine or the like; and a rear wheel (not shown) that is driven by the power unit. The motorcycle 1 is an example of a saddle riding vehicle on which a driver rides by straddling a vehicle body. In the motorcycle 1, the vehicle body can swing (bank) in right and left directions (roll direction) with reference to a ground contact point of the front and rear wheels.

In the motorcycle 1, a steering component that includes a pair of right and left front forks 5 or the like is rotatably supported by a head pipe (not shown) that is located at a front end portion of a vehicle body frame (not shown). Each of the pair of right and left front forks 5 constitutes a telescopic buffer. The front wheel (steering wheel) 3 is supported by a lower end portion of the pair of right and left front forks 5. Upper portions of the pair of right and left front forks 5 are connected to each other by a top bridge (not shown) and a bottom bridge (not shown). The steering handle 2 is supported on the top bridge.

A pair of right and left rearview mirrors 11, a lever guard 12, and the like are attached to the steering handle 2. The rearview mirrors 11 allow a rider to view a vehicle rearward direction. The lever guard 12 reduces disturbance to an operation lever that is attached to the steering handle 2. A front fender 13 that covers an upper portion of the front wheel 3 is supported by the pair of right and left front forks 5. A vehicle body front portion of the motorcycle 1 is covered by a front cowl 15.

A headlight 16 is arranged in the middle in a rightward-leftward direction of a front end portion of the front cowl 15. A window screen 17 is arranged above the headlight 16. A pair of right and left front winkers 18 are arranged on both right and left sides of an upper portion of the front cowl 15.

For example, a pair of right and left light main bodies 33 in the cornering light are arranged on both right and left sides of a lower portion of the front cowl 15. At the time of cornering of the motorcycle 1, the cornering light 30 is turned ON and illuminates the rotation direction in accordance with a leaning (banking) angle of the motorcycle 1.

For example, each of the pair of right and left light main bodies 33 is supported by each of right and left sides of the front cowl 15 (or a cowl support frame).

Figure 2:
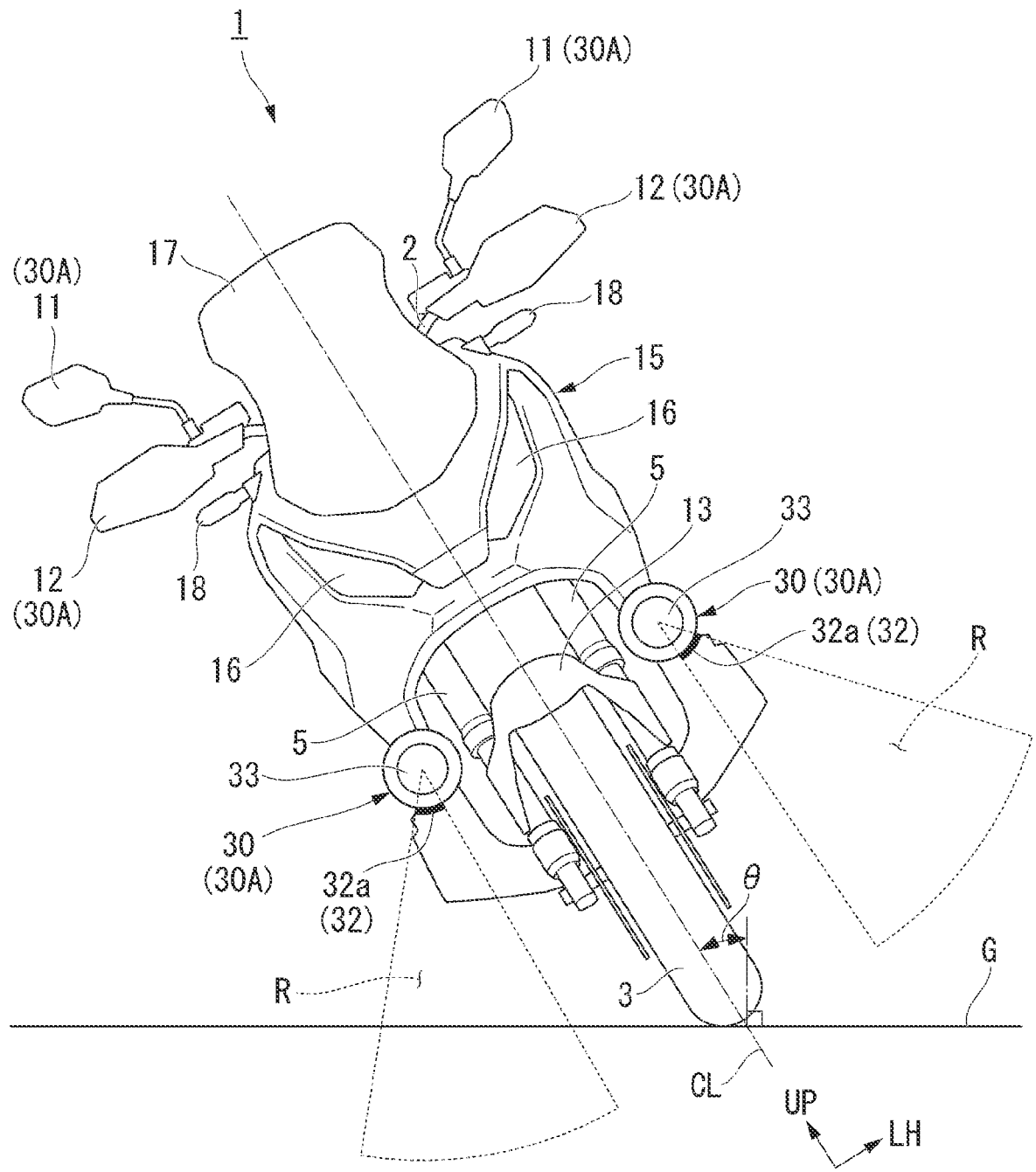
FIG. 2 is a front view showing a vehicle body bank state of the motorcycle.
Figure 3:
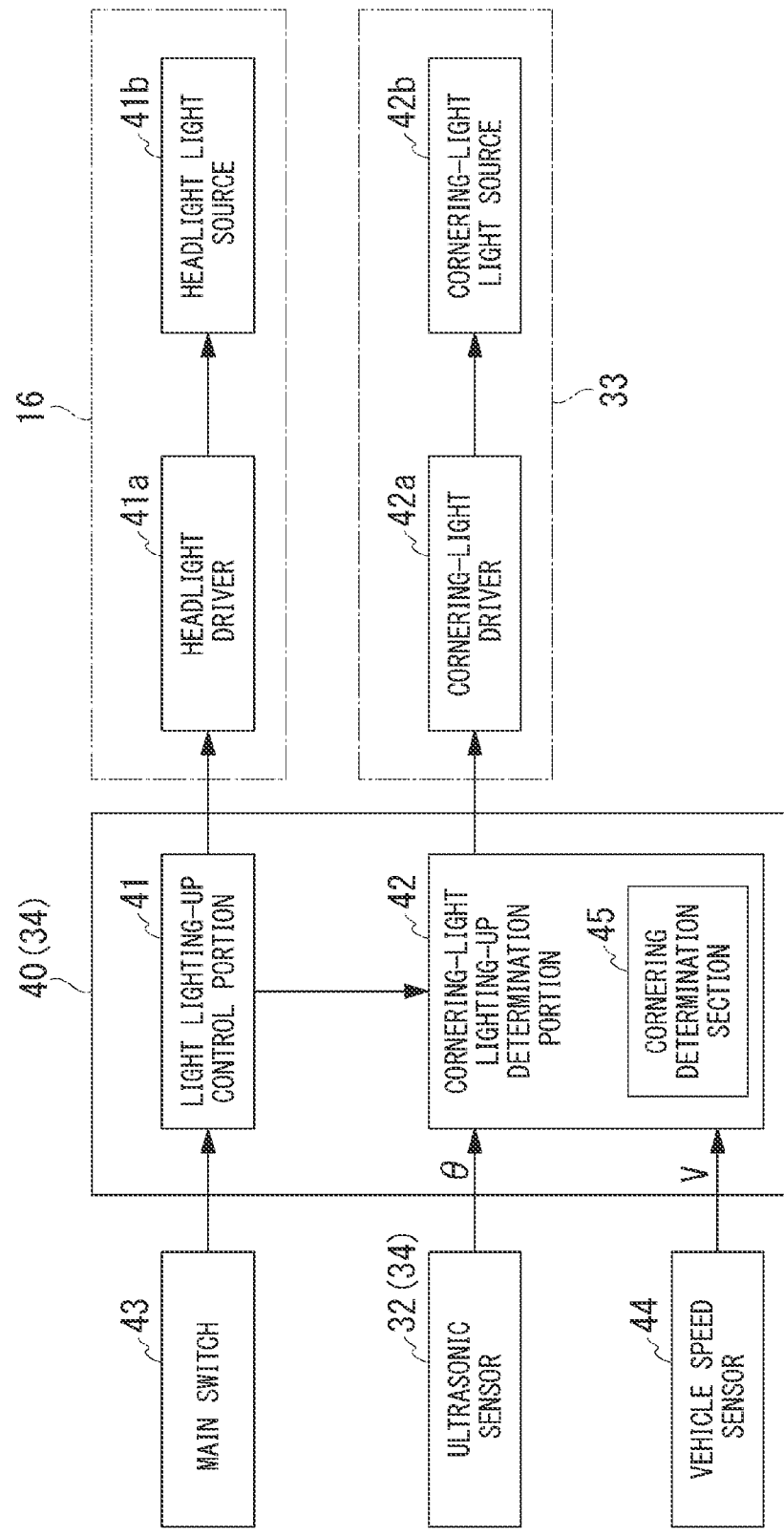
FIG. 3 is a block diagram showing a configuration of a lighting control system of a cornering light.

With reference to both FIG. 2 and FIG. 3, the cornering light 30 includes a banking angle detection device 34 that detects a leaning angle.

The banking angle detection device 34 includes: an ECU 40; and a pair of right and left ultrasonic sensors (distance measurement device) 32 that measure the distance to a road surface G. A detection signal of the pair of right and left ultrasonic sensors 32 is output to the ECU 40. The ultrasonic sensor 32 is an electromagnetic sensor such as a radar using microwaves such as infrared light or millimeter waves. The ECU 40 detects the banking angle (leaning angle) θ of the vehicle body based on the distance between each ultrasonic sensor 32 and each road surface G on both right and left sides of the vehicle body.

The cornering light 30 turns on the light main body 33 on the right side when the vehicle body leans to the right side and turns on the light main body 33 on the left side when the vehicle body leans to the left side.

<Lighting Control System>

FIG. 3 is a block diagram showing a configuration of a lighting control system of the cornering light 30.

The ECU (Electronic Control Unit) 40 of the cornering light 30 includes a light lighting-up control portion 41 and a cornering-light lighting-up determination portion 42. When the headlight 16 is always lit, the light lighting-up control portion 41 transmits a drive command to a headlight driver 41*a* in response to an ON-operation of a main switch 43 of the motorcycle 1 and turns on a headlight light source 41*b*. The cornering-light lighting-up determination portion 42 performs a lighting determination of the cornering light 30 only during driving of the light lighting-up control portion 41. When a cornering determination is made, the cornering-light lighting-up determination portion 42 transmits a drive command to a cornering-light driver 42*a* and turns on a cornering-light source 42*b*.

The cornering-light lighting-up determination portion 42 includes a cornering determination section 45. The cornering determination section 45 determines whether or not the motorcycle 1 is performing a cornering on the basis of the distance between each ultrasonic sensor 32 and each road surface G on both right and left sides of the vehicle body measured by the pair of right and left ultrasonic sensors 32 and a vehicle speed V detected by a vehicle speed sensor 44. The cornering determination section 45 compares the distances measured by the pair of right and left ultrasonic sensors 32 with each other and detects a banking angle θ and a banking direction of the vehicle body. The cornering determination section 45 performs the cornering determination when the vehicle speed V is equal to or more than a predetermined value and the leaning angle is equal to or more than a predetermined value. At this time, the cornering-light lighting-up determination portion 42 turns on any one of the right and left cornering-light light sources.

When the vehicle leans at the time of cornering, an illumination range formed on the road surface G by the headlight 16 is moved to an opposite side of the rotation direction. The cornering light 30 according to the present embodiment compensates for an illumination range in the rotation direction that becomes insufficient at the time of cornering using a light source that is separate from the headlight 16.

Each of the pair of right and left light main bodies 33 is provided integrally with each of the pair of right and left ultrasonic sensors 32 in the banking angle detection device 34. The pair of right and left light main bodies 33 and the pair of right and left ultrasonic sensors 32 constitute a pair of right and left light units 30A. The pair of right and left light units 30A are attached in a separate manner to a vehicle body component such as the front cowl 15. The pair of right and left light units 30A are provided and distributed to both right and left sides of the vehicle body component and are symmetrically arranged in a rightward-leftward direction with respect to a vehicle body rightward-leftward middle CL.

A detection portion (transmission-reception portion) 32*a* of the ultrasonic sensor 32 is arranged on a lower surface that faces a vehicle body downward direction in each light unit 30A. A detection region R having a conical shape that is wider toward the lower side is formed below the detection portion 32*a*. The detection region R is set such that a central axis line is inclined outward in a vehicle width direction. Thereby, entry of vehicle components such as the front cowl 15, a front fork 5, and the front wheel 3 into the detection region R at least in an upright state (an upstanding state, banking angle free) of the vehicle body of the motorcycle 1 is prevented. The direction directed by the detection region R has some degree of freedom on the condition that the vehicle components do not interfere.

The banking angle detection device 34 compares the values (distances to the road surface G) detected by the detection portions 32*a* on both right and left sides of the vehicle body with each other and estimates the banking angle θ and the banking direction of the vehicle body. Specifically, one of the right and left measurement distances KR, KL having a relatively short distance KS is estimated as the banking direction, and the banking angle θ is estimated from the absolute value of the difference between the right and left measurement distances KR, KL.

In the banking angle detection device 34, when the vehicle speed V becomes equal to or more than a reference value V1 and the banking angle θ (an absolute value of the difference between the right and left measurement distances KR, KL) becomes equal to or more than a reference value K1, the cornering determination becomes YES, and the light main body 33 in the banking direction is turned ON.

When the relatively short distance KS among the right and left measurement distances KR, KL is shorter than a predetermined lower limit value K2, the banking angle detection device 34 does not perform the cornering determination and does not turn on the light main body 33.

That is, when the right and left measurement distances KR, KL are significantly short, it is conceivable that the body such as the leg of the occupant or a foreign object may enter the measurement region. Alternatively, it is conceivable that the detection portion 32*a* may be dirty or fail.

Figure 4:
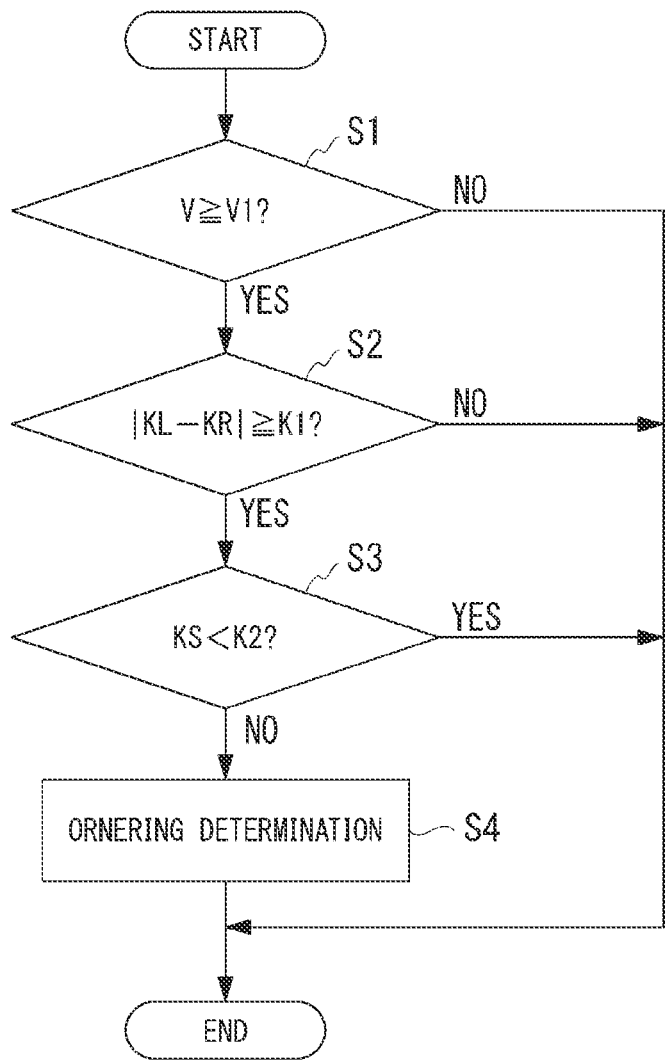
FIG. 4 is a flowchart showing a control flow to a cornering determination.

Hereinafter, a control flow of the cornering determination performed by the ECU 40 is described with reference to FIG. 4. This control flow is repeatedly performed in a predetermined cycle when an electric power supply is ON (the main switch 43 of the motorcycle 1 is ON).

First, when the main switch 43 of the motorcycle 1 is turned ON, electric power is supplied to the ECU 40, and a control is started. In Step S1, whether or not the vehicle speed V of the motorcycle 1 becomes equal to or more than the reference value V1 is determined. In the case of YES (the vehicle speed V is equal to or more than the reference value V1) in Step S1, the routine proceeds to Step S2, and whether or not the absolute value of the difference between the right and left measurement distances KR, KL is equal to or more than the reference value K1 is determined. In the case of YES (the absolute value of the difference is equal to or more than the reference value K1) in Step S2, the routine proceeds to Step S3, and whether or not the relatively short distance KS among the right and left measurement distances KR, KL is less than the predetermined lower limit value K2 is determined.

In the case of NO (the distance KS is equal to or more than the lower limit value K2) in Step S3, the cornering determination is made, and the light main body 33 in the banking direction is turned ON. In the case of NO in Step S1 or Step S2 or YES in Step S3, the cornering determination is not made, and the process is finished.

By employing a control flow in which the cornering determination is stopped when one of the right and left measurement distances KR, KL is significantly short, it is possible to prevent erroneous detection of the banking angle θ due to disturbance or the like.

For example, in the cornering light 30, a plurality of light sources may be arranged to be aligned in sequence from the inside in the vehicle width direction. At this time, for example, a control may be performed such that the number of lit light sources is increased toward the outside from the inside in the vehicle width direction as the leaning angle increases. Further, for example, a configuration may be employed in which the number of lit light sources is fixed to one, and only the lighting position is switched as the leaning angle increases. A configuration may be employed in which the light source on the inside in the vehicle width direction is dimmed in accordance with the lighting of the light source on the outside in the vehicle width direction.

As another form of the cornering light 30, the light main body 33 may be supported by both right and left sides of a vehicle body component that rotates about a steering axis together with the front wheel 3 such as the front fender 13 and the bottom bridge. Further, the light main body 33 may be supported (including integration) by the pair of right and left rearview mirrors 11, the pair of right and left front winkers 18, the pair of right and left lever guards 12, or the like.

For example, as shown in FIG. 1 and FIG. 2, the light unit 30A may be integrated by the rearview mirrors 11 and the lever guard 12.

As described above, the cornering light 30 of the saddle riding vehicle in the embodiment is provided on the motorcycle 1 which banks the vehicle body in the rightward-leftward direction and performs cornering. The cornering light 30 enlarges the illumination range in a direction to which the vehicle body is banked at the cornering. The cornering light 30 includes: the banking angle detection device 34 that detects the banking angle θ of the vehicle body using the distance measurement device (ultrasonic sensor 32) which measures the distance to the road surface G; and the light main body 33 that illuminates the direction to which the vehicle body is banked in accordance with the banking angle θ detected by the banking angle detection device 34.

According to this configuration, the cornering light 30 can be constituted by using the ultrasonic sensor 32 used for the existing clearance sensor or the like, and the cornering light 30 can be realized by reducing costs compared with the case where the IMU (Inertial Measurement Unit) or the like is used.

In the cornering light 30 of the embodiment, the light main body 33 and the banking angle detection device 34 (the ultrasonic sensor 32) constitute the integral light unit 30A, and the light unit 30A is attached in a separate manner to a vehicle body component.

According to this configuration, the light main body 33 and the banking angle detection device 34 constitute the integral light unit 30A, and thereby, it is possible to facilitate optional setting of the cornering light 30 and facilitate attachment to the vehicle body.

The term "integral" refers to a configuration that is capable of maintaining an integral state even if the configuration includes a separate body or is capable of being disassembled.

The phrase "is attached in a separate manner to a vehicle body component" refers to being attached to a vehicle body component afterward without greatly processing the outer surface of the vehicle body component.

In the cornering light 30 of the embodiment, the plurality of light units 30A are provided and distributed to right and left sides of the vehicle body and are symmetrically arranged in the rightward-leftward direction with respect to the vehicle body rightward-leftward middle CL.

According to this configuration, by arranging the light unit 30A that includes the banking angle detection device 34 to be distributed to both right and left sides of the vehicle body, each of the distances between each road surface G on both right and left sides of the vehicle body and each banking angle detection device 34 (the ultrasonic sensor 32) is measured, the banking angle θ and the banking direction of the vehicle body can be easily detected, and the banking direction of the vehicle body can be easily illuminated.

In the cornering light 30 of the embodiment, the ultrasonic sensor 32 has the detection portion 32a on the lower surface of the light unit 30A, the detection region R of the detection portion 32a is directed to the vehicle lower side, and the component of the saddle riding vehicle 1 is set so as not to interfere with the detection region at least in a vehicle body upright state.

According to this configuration, the detection region R of the ultrasonic sensor 32 is directed to the vehicle lower side and is set to avoid the vehicle component, and thereby, it is possible to reliably measure the distance between the ultrasonic sensor 32 and the road surface G.

In the cornering light 30 of the embodiment, the rearview mirrors 11 that enable viewing of the vehicle rearward direction may be attached to the steering handle 2 that is gripped by an occupant, and the light unit 30A may be attached to the rearview mirror 11.

According to this configuration, by ensuring the ground height of the light unit 30A (the ultrasonic sensor 32), the variation in the distance between the road surface G and the ultrasonic sensor 32 at the time of vehicle body banking is increased, and it is possible to facilitate the measurement of the distance between the road surface G and the ultrasonic sensor 32.

In the cornering light 30 of the embodiment, the lever guard 12 that protects the operation lever which is provided on the steering handle 2 may be attached to the steering handle 2 that is gripped by an occupant, and the light unit 30A may be attached to the lever guard 12.

According to this configuration, by ensuring the ground height of the light unit 30A (the ultrasonic sensor 32), the variation in the distance between the road surface G and the ultrasonic sensor 32 at the time of vehicle body banking is increased, and it is possible to facilitate the measurement of the distance between the road surface G and the ultrasonic sensor 32. The lever guard 12 is located in the vicinity of the outermost side of the motorcycle 1 together with the grip portion of the steering handle 2 and is arranged to be offset to a forward direction of the steering handle 2. Since the light unit 30A (the ultrasonic sensor 32) is attached to the lever guard 12, the steering handle 2, the hand of the occupant, and the like do not easily interfere with the detection region R of the ultrasonic sensor 32, and it is possible to facilitate the measurement of the distance between the road surface G and the ultrasonic sensor 32.

In the cornering light 30 of the embodiment, the ultrasonic sensor 32 has the detection portion 32a on each of both right and left sides of the vehicle body, and the banking angle detection device 34 compares values detected by the detection portions 32a on both right and left sides of the vehicle body with each other and estimates the banking angle θ.

According to this configuration, by comparing the distances between the detection portions 32a on both right and left sides of the vehicle body and the road surfaces R on both right and left sides of the vehicle body and detecting the banking angle θ of the vehicle body, the cornering light 30 can be further reliably operated.

In the cornering light 30 of the embodiment, the banking angle detection device 34 performs the cornering determination and turns on the light main body 33 when the banking angle θ becomes equal to or more than the reference value K1.

According to this configuration, in the cornering light 30 using the existing clearance sensor or the like, by turning on or off the cornering light 30 at the boundary of the reference value K1 (threshold value) of the banking angle θ, it is possible to realize the cornering light 30 by a simple control.

In the cornering light 30 of the embodiment, the banking angle detection device 34 does not perform the cornering determination when the distance measured by the ultrasonic sensor 32 is shorter than the predetermined lower limit value K2.

According to this configuration, when the distance measured by the ultrasonic sensor 32 is significantly short, since it is conceivable that the body such as the occupant's hand, clothing, baggage, or the like enters the measurement region, by stopping the cornering determination when the measurement distance is significantly short, it is possible to prevent erroneous detection of the vehicle body banking angle θ.

In the cornering light 30 of the embodiment, the banking angle detection device 34 performs the cornering determination and turns on the light main body 33 when the vehicle speed V of the motorcycle 1 becomes equal to or more than the predetermined reference value V1.

According to this configuration, even if the ultrasonic sensor 32 measures an erroneous distance due to a step on the road surface G, an object, or the like at the time of extremely low-speed traveling of the motorcycle 1, at the time of stopping, and the like, it is possible to prevent the cornering light 30 from turning on and off unnecessarily.

The present invention is not limited to the embodiment described above. For example, the saddle riding vehicle includes all vehicles on which a driver rides by straddling the vehicle body and includes not only a motorcycle (including a motorized bicycle and a scooter-type vehicle) but also a three-wheeled vehicle (including a vehicle having two front wheels and one rear wheel in addition to a vehicle having one front wheel and two rear wheels) or a four-wheeled vehicle (a four-wheeled buggy or the like). Further, the present invention may be applied to a vehicle including an electric motor as the motor.

The configurations in the embodiment described above are merely examples of the present invention, and various changes can be made without departing from the scope of the present invention such as replacing the components of the embodiment with well-known components.

What is claimed is:

1. A saddle riding vehicle cornering light structure that is provided on a saddle riding vehicle which banks a vehicle body in a rightward-leftward direction and performs cornering and that enlarges an illumination range in a direction to which the vehicle body is banked at the cornering, the structure comprising:
   a banking angle detection device that detects a banking angle of the vehicle body using a distance measurement device which measures a distance to a road surface; and
   a light main body that illuminates the direction to which the vehicle body is banked in accordance with the banking angle detected by the banking angle detection device,
   wherein the light main body and the banking angle detection device constitute an integral light unit,
   a plurality of light units each being the light unit are provided in a separate manner on a vehicle body component and are attached to be distributed symmetrically with respect to a vehicle body rightward-leftward middle,
   the distance measurement device is an ultrasonic sensor and has a detection portion on a lower surface of the light unit,
   a detection region of the detection portion is formed below the detection portion so as to be a conical shape that is wider toward a lower side,
   a central axis line of the detection region is set to be inclined outward in a vehicle width direction, and
   a component of the saddle riding vehicle is set so as not to interfere with the detection region at least in a vehicle body upright state.

2. The saddle riding vehicle cornering light structure according to claim 1,
   wherein a rearview mirror that enables viewing of a vehicle rearward direction is attached to a steering handle that is gripped by an occupant, and
   the light unit is attached in a separate manner to the rearview mirror.

3. The saddle riding vehicle cornering light structure according to claim 1,
   wherein a lever guard that protects an operation lever which is provided on a steering handle that is gripped by an occupant is located in a vicinity of an outermost side in the vehicle width direction of the steering handle and is arranged to be offset to a forward direction of the steering handle, and
   the light unit is attached in a separate manner to the lever guard.

4. The saddle riding vehicle cornering light structure according to claim 1,
   wherein the distance measurement device has a detection portion on each of both right and left sides of the vehicle body, and
   the banking angle detection device compares values detected by the detection portions on both right and left sides of the vehicle body with each other and estimates the banking angle.

5. The saddle riding vehicle cornering light structure according to claim 1,
   wherein the banking angle detection device performs a cornering determination and turns on the light main body when the banking angle becomes equal to or more than a reference value.

6. The saddle riding vehicle cornering light structure according to claim 5,
   wherein the banking angle detection device does not perform a cornering determination when a distance measured by the distance measurement device is shorter than a predetermined lower limit value.

7. The saddle riding vehicle cornering light structure according to claim 1,
   wherein the banking angle detection device performs a cornering determination and turns on the light main body when a vehicle speed of the saddle riding vehicle becomes equal to or more than a predetermined reference value.

* * * * *